Nov. 27, 1928.

K. E. PEILER 1,692,858

GLASS WORKING APPARATUS

Original Filed April 21, 1925

Inventor
Karl E. Peiler
by Robert S. Burn
Attorney.

Patented Nov. 27, 1928.

1,692,858

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

GLASS-WORKING APPARATUS.

Continuation of application Serial No. 24988, filed April 21, 1925. This application filed December 7, 1926. Serial No. 153,093

My invention relates to the art of separating mold charges of molten glass from a supply in a tank or pool, by means of molds or feeding cups that are brought into contact with the surface of the glass and are charged with glass by suction produced in the molds or cups.

The general object of my invention is to provide an improved method and apparatus for operating such suction-charged receptacles so as to control accurately the amount of glass that is charged into each receptacle.

More specifically, one object of my invention is to provide vertically adjustable shearing mechanism for suction feeding cups and for the suction molds of multiple-mold machines of the type disclosed in the patent to Owens No. 766,768, so that the quantity of glass in the cups or in the molds may be varied at will. By the independent vertical adjustment of this shearing mechanism, uniform amounts of molten glass may be separated from the gathering pool for all the cups or molds, irrespective of any irregularities therein which may cause variations of the cubic contents thereof; or, if desired, unequal quantities of molten glass may be accurately collected in the several cups or molds to form ware of different weights on the same machine.

In the following description, my invention will be described mainly in connection with suction-fed parison molds. It will be understood that this description applies equally well to feeding cups that are charged by suction and thereafter empty their charges into molds, and that my invention includes both of these kinds of apparatus.

In the suction-type molds that are at present in use, the glass in each mold is separated from the glass in the gathering pool by means of a shear blade which slides across and in contact with the lower surface of the mold or in contact with a shear-bushing carried by the mold. No means have heretofore been provided to compensate for inaccuracies of the interior configuration of the mold cavity which are caused by general wear and cleaning, or for the wearing away of the bottom of the mold by reason of the frictional contact of the shearing element therewith, or for repairs occasioned thereby.

In some cases it is desirable to adjust the weight of the mold charges gathered by a given mold or set of molds to suit different requirements. In other cases it is desirable to obtain a precise quantity of molten glass for each mold charge in every parison mold of a multiple mold machine in order to produce uniform finished ware. In still other cases it may be desirable to collect mold charges of different weights in certain of the parison molds of a multiple-mold machine, so that finished ware of different forms and weights may be produced by the same machine and by means of similar parison molds.

The same considerations apply to transfer cups which lift charges of glass by suction and then deposit the charges in molds. It is desirable to control the exact quantity of glass that is segregated by each cup, so as to insure that all cups of a given installation will segregate equal charges, or to alter the quantities segregated by different cups, as may be desired.

According to this invention, a pair of opening and closing shear blades is provided for each cup or mold, and the height of the shearing plane beneath each cup or mold is adjusted in respect to the bottom of the cup or to suit the requirements of that particular receptacle, thus permitting inaccuracies in the receptacles to be corrected, and also permitting the production of unequal mold charges by receptacles of the same size.

Figure 1:
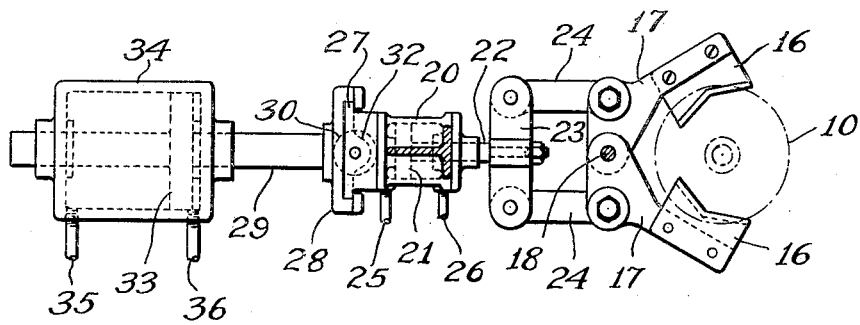
Figure 1 is a plan view of a shearing apparatus constructed in accordance with this invention, with parts removed for clearness.

Referring to the drawing, the numeral 10 indicates a parison mold of the suction type, adapted to cooperate with a gathering pool 11 to withdraw a quantity of molten material therefrom to form a mold charge 12. The connections for applying suction to the interior of the mold 10 form no part of the present invention, and are not illustrated herein.

The mold 10 is constructed in two parts which are removably attached to arms 13 fulcrumed on a pivot stud 14 secured in a bracket 15. This bracket may form a part of one unit of a multiple-mold glass forming machine, each unit having complete independent mechanisms to separate mold charges from a source of supply, to form parisons, and to produce the finished ware.

Beneath each mold 10 is a shearing device adapted to be horizontally reciprocated into and out of shearing relation to the parison mold by a fluid-pressure cylinder mechanism. A second fluid-pressure cylinder, mounted for vertical adjustment in a head formed in the first cylinder, opens and closes the co-acting shear blades of the shearing device to sever the molten glass in the parison mold from the glass in the pool. The details of construction of this shearing device will now be described.

Coacting shear blades 16 are carried by levers 17 which are pivotally mounted for oscillatory movement on a stud 18 secured to an overhanging arm 19 which is attached to, and may be integral with, a shear operating fluid pressure cylinder 20, the piston 21 of which is connected to open and close the shear blades through a piston rod 22, a crosshead 23 secured to the piston rod 22, and links 24 which are pivotally attached to the crosshead 23 and to the shear levers 17.

The piston 21 is moved forward in the cylinder 20 to yieldingly close the shear blades by fluid pressure supplied to the rear of the cylinder through a pipe 25. A pipe 26 supplies fluid pressure to the front of the cylinder 20 to move the piston 21 to the rear and thus pull the shear blades apart.

The shear-operating cylinder, and the shear structure carried thereby, are projected bodily forward prior to each shear cut and are retracted after each shear cut, by means of a fluid pressure cylinder 34, and the cylinder 20 is arranged for vertical adjustment with respect to the cylinder 34. To this end, the cylinder 20 is mounted in a guideway 27 formed in a head 28 carried on one end of the piston rod 29 of the cylinder 34. The vertical position of the cylinder 20, and of the shears carried thereby, is adjusted by means of a screw 30 which extends through a screw-threaded opening in a bearing 32 formed in or attached to the head 28.

The inner end of the piston rod 29 carries a piston 33 which is reciprocated to advance the shearing mechanism into operative relation to the parison mold by admitting fluid pressure into the rear of the cylinder 34 through a pipe 35, and to retract said mechanism by introducing fluid pressure into the front of the cylinder through a pipe 36. The retraction of the shearing mechanism brings it to a cool zone when the shears are not in operation. Suitable air valves for actuating the shear cylinders and automatic timing mechanism for operating such valves in their proper order are preferably provided, but are not shown in the accompanying drawing because such valves and timing mechanisms are well known in this art.

Figure 2:
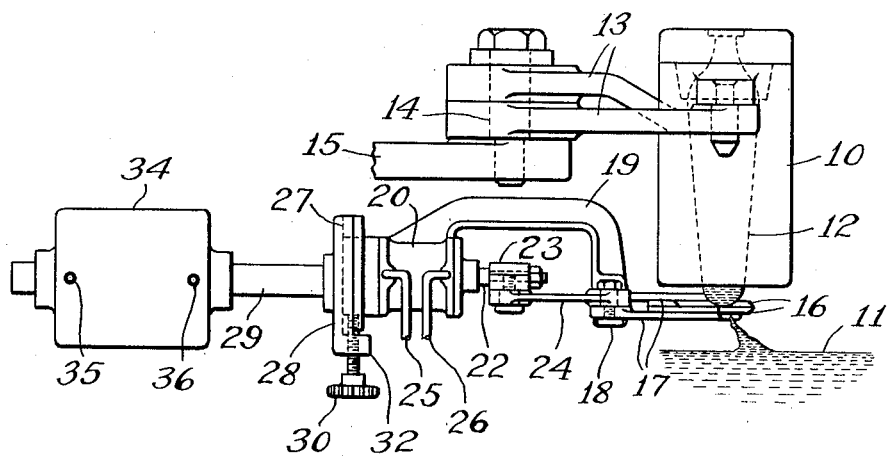
Fig. 2 is a side elevation thereof.

In operation, the unit of the machine carrying the mold 10 and its associated shear mechanism is brought above the gathering pool 11, the mold 10 is lowered to the surface of the pool, a charge of glass is drawn up into the mold by suction, and the mold is lifted above the pool. The shearing mechanism is then projected forward by the cylinder 34 to bring the shear blades into proper position to sever the glass beneath the mold, whereupon the cylinder 20 is operated to close the shear blades and sever the glass as shown in Fig. 2. The shears are then opened by the cylinder 20 and the entire shear structure is retracted to its starting position by the cylinder 34.

It will be noted that a substantial stub of glass remains, after shearing, below the mold 10. Vertical adjustment of the shearing plane changes the size of this projecting stub, and thus changes the size of the total mold charge to any desired extent within considerable limits.

Figure 3:
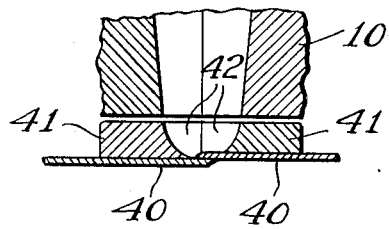
Fig. 3 is a fragmentary vertical sectional view showing a modified form of shears.

Fig. 3 shows a modified construction in which the shears are made of hollow or box form, so as to give partial shape and support to the stub of glass above the shearing plane during and, if desired, after the shearing operation. In this figure, shear blades 40 are associated with the molds 10. These blades are formed with upward extensions 41 which may be integral with or attached to the blades 40, and which are formed with cavities 42 which, when the shears are closed, cooperate to form an enclosure which supports the glass stub above the shears while the shears are closed. By suitably shaping the cavities 42, the shape of the stub of glass may be varied to suit the requirements of the parison. These box-shears are intended to be operated and vertically adjusted in the manner shown in Figs. 1 and 2.

This application is a continuing substitute for my copending application filed April 21, 1925, Serial No. 24,988, which contains the same disclosure as the present application in all respects except that the said application Serial No. 24,988 did not specifically state that this invention is applicable to suction feeding cups as well as to suction-fed molds.

In the subjoined claims, the term "receptacle" is intended to include any device, whether a mold, a gathering cup or other container, which segregates charges of molten material by lifting the charges through the action of suction produced within the receptacle.

This invention is not limited to the particular details of construction set forth herein, and modifications may be resorted to without departing from the scope of the appended claims.

I claim as my invention:

1. In combination with a receptacle for segregating charges of molten material by suction, a severing mechanism adapted to separate charges of molten material collected by said receptacle from a body of such material, said severing mechanism including shear blades spaced below the receptacle, and means for adjusting said severing mechanism toward and from said receptacle to regulate the size of said charges.

2. In combination with a receptacle for segregating mold charges of molten glass by suction, a severing mechanism below said receptacle, said severing mechanism including shear blades spaced below the receptacle, and means for raising or lowering the severing plane of said severing mechanism in respect to said receptacle.

3. In combination with a receptacle for segregating mold charges of molten glass by suction, shear blades spaced below the receptacle and adapted to close beneath said receptacle, and means for vertically adjusting the position of said shear blades with respect to said receptacle.

4. In combination with a receptacle for segregating mold charges of molten glass by suction, a severing mechanism adapted to separate a mold charge collected by said receptacle from a body of glass, means for reciprocating said mechanism into and out of position beneath said receptacle, and means for raising and lowering said severing mechanism in respect to said receptacle.

5. In combination with a receptacle for segregating mold charges of molten glass by suction, shear blades adapted to close beneath said receptacle to separate a mold charge collected by said receptacle from a body of glass, means for reciprocating said shear blades into and out of position beneath said receptacle, means for opening and closing said shear blades, and means for raising and lowering said shear blades with respect to said receptacle.

6. In combination with a receptacle for segregating mold charges of molten glass by suction, shear blades adapted to separate a mold charge collected by said receptacle from a body of glass, fluid pressure means for reciprocating said shear blades into and out of shearing position, means for opening and closing said shear blades, and means for adjusting said shear blades toward and away from said receptacle.

7. In combination with a receptacle for segregating mold charges of molten glass by suction, shear blades adapted to close beneath said receptacle to separate a mold charge collected by said receptacle from a body of glass, fluid-pressure means for reciprocating said shear blades into and out of position beneath said receptacle, fluid-pressure means for opening and closing said shear blades, and means for raising and lowering said shear blades with respect to said receptacle.

8. In combination with a receptacle for segregating mold charges of molten glass by suction, shear blades adapted to separate a mold charge collected by said receptacle from a body of glass, means for reciprocating said shear blades into and out of severing position, fluid-pressure means for opening and closing said shear blades, and means for adjusting said shear blades toward and away from said receptacle.

9. In combination with a receptacle for segregating mold charges of molten glass by suction, shear blades adapted to close beneath said receptacles to separate a mold charge collected by said receptacle from a body of glass, a fluid pressure cylinder connected to reciprocate said shear blades into and out of severing position beneath said receptacle, a fluid-pressure cylinder supporting said shear blades and connected to open and close said shear blades, and means for vertically adjusting said last-named cylinder with respect to said receptacle.

10. In combination with a receptacle for segregating mold charges of molten glass by suction, sheer blades adapted to close beneath said receptacle to separate a mold charge collected by said receptacle from a body of glass, a fluid-pressure cylinder connected to reciprocate said shear blades into and out of severing position beneath said receptacle, a fluid-pressure cylinder supporting said shear blades and connected to open and close said shear blades, and means for vertically adjusting said last-named cylinder with respect to said receptacle, said adjusting means comprising a guideway carried by the piston rod of said first-named cylinder and slidably carrying said second cylinder, and an adjusting screw for fixing the position of said second cylinder with respect to said guideway.

11. In combination with a receptacle for segregating mold charges of molten glass by suction, shear blades adapted to close beneath said receptacle and to separate a mold charge collected by said receptacle from a body of glass, said shear blades being shaped to support and shape the stub of glass remaining above the shearing plane after severance, and a cylinder and reciprocable piston for supporting and actuating said shear blades.

12. In combination with a receptacle for segregating mold charges of molten glass by suction, shear blades adapted to close beneath said receptacle and to separate a mold charge collected by said receptacle from a body of glass, said shear blades having cooperating cavities which, when said shears are closed, form an enclosure for supporting and shaping the stub of glass remaining above the shearing plane after severance, and a cylinder and reciprocable piston for supporting and actuating said shear blades.

13. In combination with a receptacle for segregating charges of molten material by suction, severing mechanism adapted to separate a mold charge of molten material collected by said receptacle from a body of such material, a cylinder and reciprocable piston for supporting and actuating said severing mechanism, and means for adjusting said severing mechanism toward and from said receptacle to regulate the size of said charge.

14. In combination with a receptacle for segregating mold charges of molten glass by suction, shear blades adapted to close beneath said receptacle, a cylinder and reciprocable piston for supporting and actuating said shear blades, and means for vertically adjusting the position of said shear blades with respect to said receptacle.

15. The combination, with a receptacle for segregating charges of molten glass by suction, of severing means spaced below said receptacle for separating charges, collected by said receptacle, from a body of molten glass, and means for shaping the stub of glass depending from said receptacle after each severing operation.

16. The combination, with a receptacle for segregating charges of molten glass by suction, of a pair of shear blades arranged to close at a level spaced below said outlet for separating charges, collected by said receptacle, from a body of molten glass, and means operable by said shear blades to support and shape the glass extending from said receptacle to the severing plane.

17. The method of forming a mold charge of molten glass, which comprises drawing glass by suction from a body of molten glass into a receptacle, severing the connecting glass between the receptacle and the body of glass so that a stub of glass extends from the receptacle, and shaping said stub.

18. The method of forming a mold charge of molten glass, which comprises drawing glass upwardly by suction from a pool of glass into a receptacle, and severing the connecting portion of glass between the receptacle and the pool at a plane spaced below the receptacle bottom and simultaneously shaping the stub of glass between the receptacle and the severing plane.

19. The method of controlling the size of mold charges of molten glass gathered from a glass supply by a suction fed receptacle, which comprises periodically presenting the receptacle to the surface of the glass, drawing glass upwardly into said receptacle and severing the glass in a plane spaced below the receptacle, the distance of the severing plane below the receptacle varying with the size of the charge desired.

20. The method of obtaining a series of mold charges of molten glass of equal weight collected by a plurality of suction fed receptacles having cavities of unequal cubic capacity, which comprises successively presenting the receptacles to the surface of a glass supply, drawing charges of glass into said receptacles and severing the glass gathered in the successive receptacles from the glass of the supply in planes spaced from and below the receptacles, said spacing being selected and differing in accordance with the cubic capacity of the several receptacles.

Signed at Hartford, Connecticut, this 17th day of November, 1926.

KARL E. PEILER.